T. W. SMALL.
STREET INDICATING MECHANISM.
APPLICATION FILED JULY 16, 1910.
1,179,769.
Patented Apr. 18, 1916.
3 SHEETS—SHEET 1.
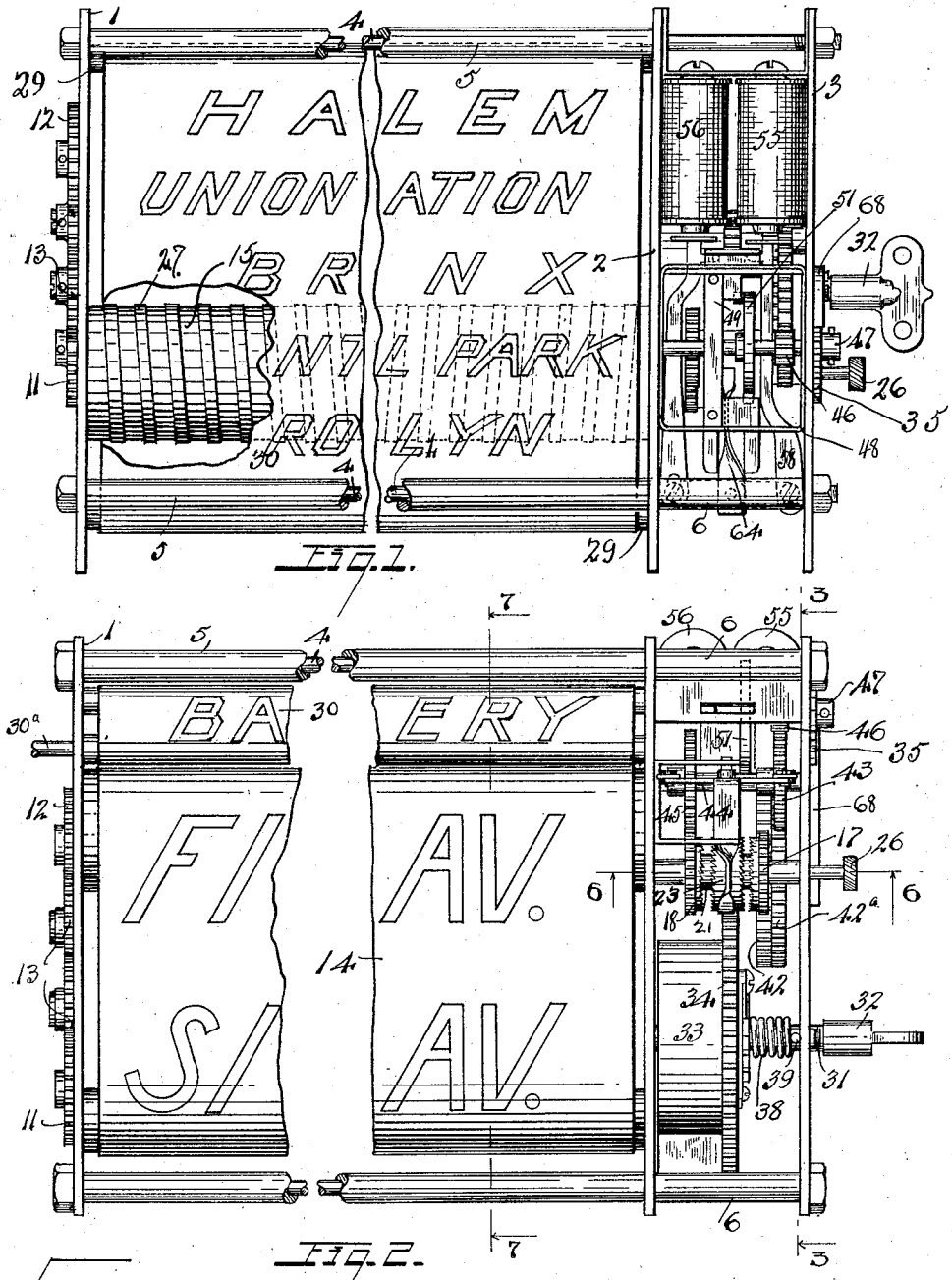

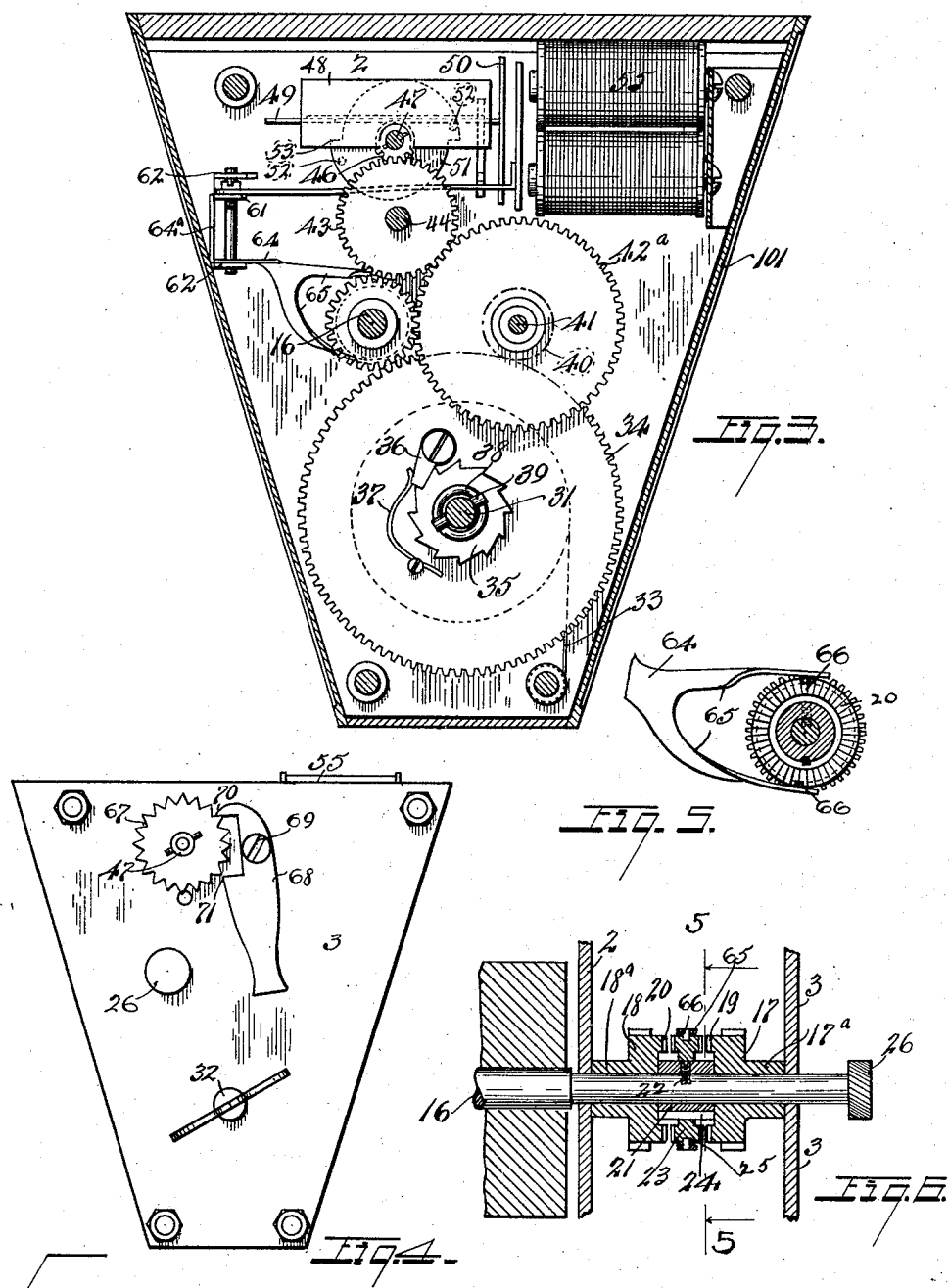

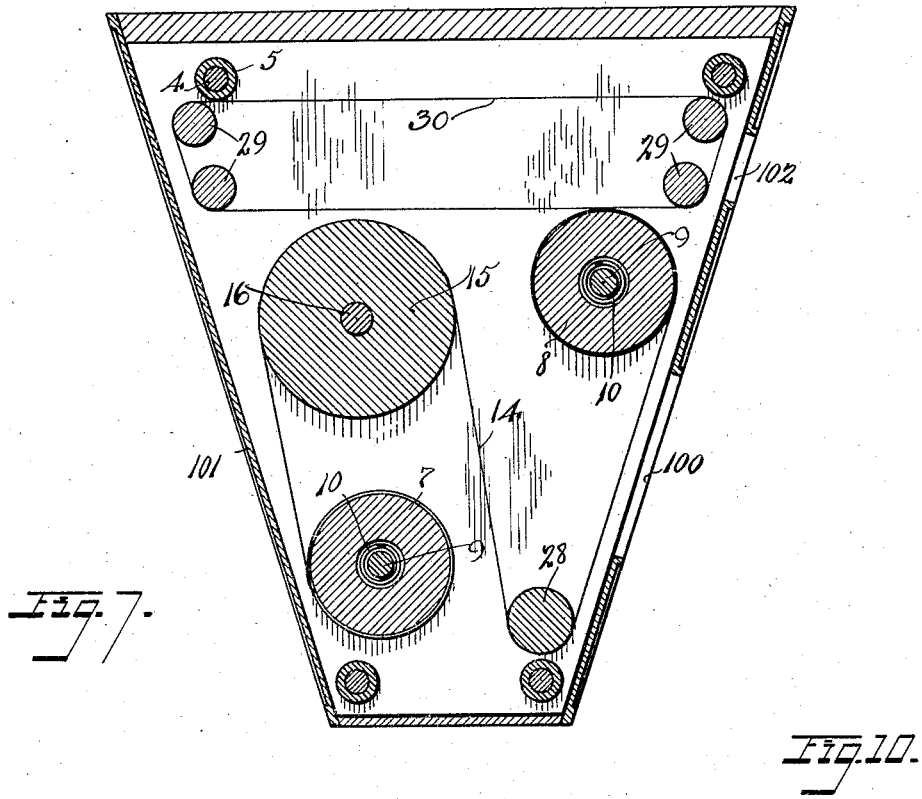
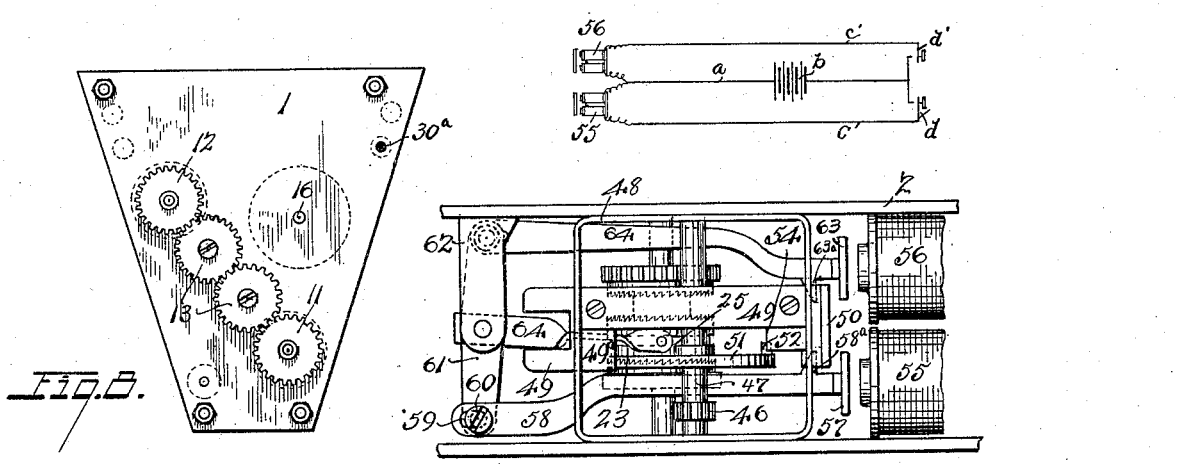

UNITED STATES PATENT OFFICE.

THOMAS W. SMALL, OF CLEVELAND, OHIO, ASSIGNOR TO THE ACME INDICATOR COMPANY, OF CLEVELAND, OHIO, A CORPORATION OF OHIO.

STREET-INDICATING MECHANISM.

1,179,769.      Specification of Letters Patent.      Patented Apr. 18, 1916.

Application filed July 16, 1910. Serial No. 572,349.

*To all whom it may concern:*

Be it known that I, THOMAS W. SMALL, a citizen of the United States, residing at Cleveland, in the county of Cuyahoga and State of Ohio, have invented a certain new and useful Improvement in Street-Indicating Mechanism, of which the following is a full, clear, and exact description, reference being had to the accompanying drawings.

This invention relates to a street indicating mechanism of the general type shown in my application No. 529,681, filed November 24, 1909.

In the application referred to, there is shown a street-indicating mechanism comprising a pair of spring drums with a strip or web having its opposite ends connected to said drums and suitable intermediate feeding rollers arranged to feed the strip from one roller to another and to display, through an appropriate slot in a casing, an inscription indicating a street which is being approached.

In the aforesaid application, a spring motor is provided for driving the web or strip-feeding mechanism, and means are provided for automatically insuring the feeding of certain definite equal lengths of strip, at every closing of an electric circuit; also certain other advantageous constructions are shown, described and claimed.

It is the purpose of this invention, while retaining a spring motor, to provide means whereby the direction of feed of the web or strip may be electrically reversed. The advantage of employing such electric reversal of drive, together with a spring motor for driving the parts, is the possibility of maintaining equidistant the successive advances made by the web or strip in the feeding operation, whereby perfect alinement may be secured, at all times, between the inscriptions on the web or strip and the sight opening in the casing.

With the foregoing general object in view, the invention may be defined further and generally as consisting of the combinations of elements embodied in the claims hereto annexed and illustrated in the drawings forming part hereof, wherein—

Figure 1 represents a top plan view of an indicating mechanism constructed in accordance with my invention, the casing being omitted; Fig. 2 represents a front elevation of such mechanism; Fig. 3 represents a sectional view corresponding to the line 3—3 of Fig. 2; Fig. 4 represents an end elevation, on a reduced scale, of the apparatus shown in Figs. 1 and 2; Fig. 5 represents a sectional detail corresponding to the line 5—5 of Fig. 6; Fig. 6 represents a sectional detail corresponding to the line 6—6 of Fig. 2; Fig. 7 represents a sectional view corresponding to the line 7—7 of Fig. 2; Fig. 8 represents an elevation on the left hand end of the apparatus shown in Figs. 1 and 2; Fig. 9 represents an enlarged detail in plan of the mechanism for limiting and reversing the drive of the web or strip; Fig. 10 is a diagrammatic view indicating the manner in which the mechanism may be electrically driven and electrically reversed.

Describing the parts by reference characters, 1, 2 and 3 denote vertical plates, said plates being held together by means of rods 4 having distance sleeves 5 and 6 thereon. The plates 2 and 3 and rods 4 constitute generally the framework of the mechanism. The plates 2 and 3 are relatively close together and provide a space for the reception of the driving mechanism, gears and automatic controlling mechanism, while the plates 1 and 2 are spaced farther apart and receive the various rollers by which the strip is fed across the sight opening 100 in the casing 101 into which the framework is inserted.

Mounted between plates 1 and 2 are the drums to which the opposite ends of the strip or web are secured. These drums are shown as spring barrels or drums 7 and 8, such as covered by my Patent #738,366, issued September 8, 1903, each barrel or drum being mounted on a shaft 9 journaled in the framework, each drum being hollow, with a helical spring 10 located in the bore and being connected at one end with the drum and at the other end with a shaft 9. Each shaft projects through the plate 1 and is provided at its ends with gears 11 and 12, respectively, these gears being connected by a pair of intermediate gears 13 carried by stub shafts projecting from the plate 1. The gears 13 are of the same size as gears 11 and 12, whereby both drum shafts are driven at the same rate of speed. Owing to the spring connection between each drum and its shaft, provision is made for compensating for the differences between the diameters of the drums due to the unequal distribution of the web or strip 14 thereon.

15 denotes a large feed-roller which is here shown as located near one side of the frame and is spaced from and arranged intermediately between the drums 7 and 8. This roller is mounted on a shaft 16 which is journaled in the plates 1 and 2 and projects through the plate 3. The shaft is provided with a pair of clutch members 17 and 18 loosely mounted thereon, each member being provided with a clutch face 19 and 20, respectively. The space between these members is provided with a sleeve 21, which is rigidly secured to the shaft 16, as by means of a screw 22.

The clutch 23 is slidably mounted upon the sleeve 21 and is kept in driving engagement therewith by means of a long key-way 24, which receives a spline or feather, carried by the clutch. The clutch is provided with a groove 25 extending therearound, which groove is adapted to receive pins carried by an operating yoke, to be described hereinafter. The end of the shaft 16 projects through the plate 3 and is provided with a knurled head 26, by means of which the shaft 16 may be rotated by hand, if desired.

The roller 15 is provided with tape 27 wound thereon spirally from opposite ends of the roller toward the center. This tape is for the purpose of enabling the cloth web or strip to be fed evenly from either of the spring barrels without wrinkling or "slip" and at the same time preserve the alinement of the indications with the sight opening, as pointed out in my application No. 529,681.

An idle roller 28 is interposed between the roller 15 and the drum 8. This roller is so arranged as to direct the web or strip 14 past the window 100 and loop the same in an efficient manner around the roller 15 so as to insure the driving of the drums 7 and 8. For the purpose of indicating the destination of the car or vehicle, a suitable number of rollers (shown as four) are located in the upper portion of the casing. These rollers, 29, carry a strip 30, which is provided with designations indicating the destination of the vehicle, such designations being exposed through the opening 102. One of these rollers is provided with a shaft 30ª extending outside the casing, by means of which the strip may be fed.

Reference has been made to the reversal of the rotation of the driving roller 15 and and the consequent rotation of the other rollers and of the spring barrels. The driving mechanism whereby this result may be accomplished includes a spring motor and will now be described.

31 denotes a shaft which is mounted between the plates 2 and 3 and is provided with a winding key 32 projecting through the plate and the casing 101. The shaft 31 is provided with a spring 33 adapted to be wound by means of the key 32, and the shaft is also provided with a gear 34 and with a ratchet 35 and a pawl 36, which is pressed into engagement with the teeth of the pawl by means of a spring 37. The shaft 31 is also surrounded by a spring 38, engaging a pin 39 carried by the shaft and pressing against the face of the ratchet 35. The gear 34 meshes with a pinion 40 on a shaft 41, which is journaled in the plates 2 and 3. This shaft is provided with a two-faced gear 42, 42ª, one face of which, 42ª, meshes with a gear 43 on a shaft 44, also mounted in the plates 2 and 3. The shaft 44 is provided with a gear 45, similar to the gear 43. The spur gear portion of the clutch member 18 on the shaft 16 is arranged to mesh with the gear 45. The spur gear portion of the clutch member 17 meshes with the gear face 42. With this arrangement, the gears 17 and 18 will be driven idly on the shaft 16 and in reverse directions during the operation of the spring motor, but the shaft may be driven by either of these gears by merely shifting the clutch 23 to bring its appropriate faces into engagement with the faces of the members 17 and 18. It will be noted that the clutch members 17 and 18 are provided each with a neck 17ª, 18ª, respectively, which are adapted to bear against the plates 3 and 2 respectively. For the purpose of operating the clutch 23, and limiting the feeding of the strip or web by the spring, I provide the electromagnetic controlling and releasing mechanism shown more particularly in Figs. 3, 5 and 9.

The gear 43 meshes with a pinion 46 on a shaft 47, which is also journaled in the plates 2 and 3.

48 denotes a frame or housing having its lower end recessed for application to the shaft 47 and mounted in the space between the plates 2 and 3. This frame is provided in opposite sides with apertures through which extends a plate 49 of non-magnetic material having an extension 50 arranged at right angles with respect thereto. The plate 49 is provided, between the opposite sides of the frame 48, with a slot for the reception of a cam 51 mounted on the shaft 47. This cam is provided with a pair of pins 52 located 180 degrees apart and with an abrupt shoulder 53 adjacent to each pin 52 and to the rear of the same with reference to the direction of rotation of the cam. The plate 49 is provided with a ledge 54 which, when the parts are in the position shown in Fig. 9, is adapted to be engaged by a pin 52 to prevent the rotation of the parts and especially of the feed roller 16 by the spring 34.

55 and 56 denote two vertically arranged pairs of electro-magnets. In front of each pair of magnets is an armature, and each armature has an extension arranged to operate the clutch 23, to throw it into mesh with either of the gears 19 or 20, according to which of the pairs of magnets is energized. One of these armatures is shown at 57 and has its lower end provided with an arm 58, which is provided at the end opposite the armature with an elongated slot 59 connected by a screw or stud 60 and with one arm of a lever 61, said lever being pivoted intermediate of its ends to a U-shaped bracket 62 projecting from the plate 2. The arm 58 is provided with a projection 58$^a$ which is on the opposite side of the extension 50 from the electro-magnets 55. The opposite pair of magnets 56 has in front thereof an armature 63 connected to an arm 64 similar to the arm 58 and connected in like manner (by a pin-and-slot connection) with the opposite end of the lever 61 and having a projection 63$^a$ extending behind the projection 50. The central portion of the lever 61 is provided with an arm 64 rigid therewith, and said arm is provided with a yoke 65, the pins 66 of which enter the slot 25 in the clutch 23. The rear end of arm 64 is substantially U-shaped, as shown at 64$^a$, the lower branch being supported by the lower branch of the bracket 62.

With the construction just described, when the magnets 55 are energized, the armature 57 is drawn toward the magnets, rocking the lever 61 and throwing the clutch 23 into driving connection with the member 18, whereby the shaft 16 will be driven by said member. This movement of the lever 58 operates the plate 49 by the engagement of the projection 58$^a$ with the plate 50 and disengages the ledge 54 from the pin 52, allowing the shaft to be rotated by the spring. The shaft 47 rotates until the outwardly projecting portion of the cam engages the rear edge 49$^a$ of the plate 49 and pushes the same away from the magnet, carrying with it the armature 57, this action being permitted by the lost-motion connection between the lever arm 58 and the lever 61. At the end of its movement, the plate 49 will be carried a sufficient distance to place the lever 61 in neutral position, with the clutch 23 out of engagement with either of the members 17 or 18. When the magnets 56 are energized, a similar action occurs except that the lever 61 is rotated in the reverse direction, and the clutch 23 is thrown into mesh with the member 17, thus driving the shaft 16 in the reverse direction from that in which it had been previously driven, through the movement of the arm 58. The shaft 47 will again be free to rotate until the projecting end of one of the cams thereon moves it rearwardly as before and brings the ledge 54 into position to be engaged by a pin 52. In order to regulate the speed of rotation of the parts and to prevent such speed from becoming excessive, I provide the shaft 47 with an escapement. This shaft projects through the frame plate 3 and has mounted thereon a toothed wheel 67.

68 denotes a pendulum escapement pivoted at 69 and provided with projections 70 and 71 adapted to engage the teeth of the wheel 67 in the usual manner. This escapement will operate to retard the rotation of the shaft 47, the speed of rotation of such shaft being governed by the number of teeth on the wheel and the moment of inertia of the pendulum.

In Fig. 10 there is shown diagrammatically a circuit arrangement through which the driving of the mechanism may be controlled. In this figure, $a$ denotes a conductor conveying current from any source $b$ to both sets of magnets 55, 56. $c$ denotes the opposite conductor for one set of magnets 55, and $c'$ the opposite conductor for the magnets 56. $d$ and $d'$ denote switch buttons which may be employed to close the circuit between $a$ and $c$, or $a$ and $c'$, as desired. When the car is running in one direction, the conductor or gateman can operate the magnets 56 as the car approaches different street crossings or stops by pushing the button $d$ and thereby drive the shaft 16 in the proper direction and for the length of time sufficient to display the corresponding indications on the web or strip. On the return trip, he pushes the button $d'$ as the car approaches the street crossings or stops. This will cause the drive shaft 16 to be driven in the reverse direction and the strip or web to be driven accordingly. Each button will be provided with a designation indicating the direction of the trip. It is obvious that the indicator can also be actuated by means of contacts carried by the trolley or by obstructions attached to the track in any well known manner.

The construction described is particularly well adapted for the incidents of use. It enables me to retain a spring motor for the purpose of driving the shaft by which the web or strip is fed and to electrically reverse the drive of said shaft. I consider this feature an exceedingly valuable one as, if an electric motor be employed to drive such shaft in reverse directions, it is practically impossible to drive an equal distance each time, and hence it is impossible to secure a display of the proper indication through the casing slot. Should it be desirable, for any reason, to wind the web or strip by hand, this may be done by means of the knurled handle 26. The clutch members 17 and 18 being mounted loosely upon the shaft, the rotation of the shaft by hand will not be affected by the other mechanism, since if the clutch be in mid- or disengaged position the shaft 16 is entirely free to be rotated without opposition, and if the clutch 23 be in engagement with either of the members 17 or 18 it can be disengaged by merely turning the shaft 16 rearwardly a sufficient distance to cause the inclination of the teeth to wedge this member out of the way. It will be observed that, when the magnet circuits are open, the armature projections 58ª and 63ª are spaced from the projection 50 a shorter distance than the "throw" of the armatures but a sufficient distance from the projection 50 to allow the clutch to be shifted by either armature before its projection engages the projection 50. This insures the engagement of the clutch with the proper drive shaft gear before the release of the spring motor, which operates such gears, and the equidistant feeding of the web or strip during each operation of the motor is assured.

Having thus described my invention, what I claim is:—

1. In an indicating mechanism, the combination of a pair of strip-supporting drums, a shaft, a roller thereon, a strip in driving engagement with said roller and connected to said drums, a pair of gears loosely mounted on said shaft, a clutch slidable on said shaft between said gears and having a driving connection with the shaft, a spring motor, connections for driving said gears in reverse directions from said motor, means for releasing said motor, means for limiting the movement of the motor when so released, electrically operated means for moving the clutch into engagement with either of the gears, and means for retarding the release of the motor until after the engagement of the clutch.

2. In an indicating mechanism, the combination of an indicating device, a shaft for operating said device, a pair of gears loosely mounted on said shaft, a clutch slidable on said shaft between said gears and having a driving connection with the shaft, a spring motor, connections for driving said gears in reverse directions from said motor, means for releasing said motor, means for limiting the movement of the motor when so released, electrically operated means for moving the clutch into engagement with either of the gears, and means for retarding the release of the motor until after the engagement of the clutch.

3. In a mechanism of the character set forth, the combination of a pair of drums each having an end of a strip connected thereto, a shaft, means driven by said shaft for feeding the strip from one drum to the other, a spring motor, a pair of gears loosely mounted on said shaft, a clutch slidably mounted between said gears and having a driving connection with said shaft, driving connections between the motor and said gears for rotating the gears in reverse directions, a pair of electromagnets, an armature for each of said magnets, an operative connection between each armature and the clutch for moving the same in reverse directions, and means operated by said magnets for releasing the motor and limiting the rotation thereof.

4. In a mechanism of the character set forth, the combination of a pair of drums each having an end of a strip connected thereto, a shaft, means driven by said shaft for feeding the strip from one drum to the other, a spring motor, a pair of gears loosely mounted on said shaft, a clutch slidably mounted between said gears and having a driving connection with said shaft, connections between the motor and said gears for rotating the gears in reverse directions, a pair of electromagnets, an armature for each of said magnets, an arm connected with said clutch, a lost-motion connection between each armature and said arm whereby each armature will move said clutch in a reverse direction from that imparted to it by the other armature, and means operative by either of said magnets for releasing and limiting the rotation of the motor.

5. In an indicating mechanism, the combination of an indicating device, a shaft, means driven by said shaft for operating said device, a spring motor, a pair of gears loosely mounted on said shaft, a clutch slidably mounted between said gears and having a driving connection with said shaft, connections between the motor and said gears for rotating the gears in reverse directions, a pair of electromagnets, an armature for each of said magnets, a lever connected with said clutch, a lost-motion connection between each armature and said arm whereby each armature will move said clutch in a reverse direction from that imparted to it by the other armature, and means operative by either of said armatures for releasing and limiting the rotation of the motor.

6. In an indicating mechanism, the combination of an indicating device, a shaft, means driven by said shaft for operating said device, a spring motor, a pair of gears loosely mounted on said shaft, a clutch slidably mounted between said gears and having a driving connection with said shaft, driving connections between the motor and said gears for rotating the gears in reverse directions, a pair of electromagnets, an armature for each of said magnets, a connection between each of said armatures and said clutch for moving the latter in reverse directions, and means operated by either of said armatures for releasing and controlling the rotation of said motor.

7. In an indicating mechanism, the combination of an indicating device, a shaft, connections for driving said device from said shaft, a spring motor, means including a clutch for rotating said shaft in reverse directions from the spring motor, a pair of electromagnets, an armature for each of said magnets, a connection between each armature and the clutch, means operated by either of said armatures for releasing said motor after the clutch has been operated by such armature, and means for limiting the rotation of said motor.

8. In a mechanism of the character set forth, the combination of an indicating device, a shaft, connections for driving said device from said shaft, a spring motor, a pair of gears loosely mounted on said shaft, a clutch slidably mounted between said gears and having a sliding connection with said shaft, driving connections between the motor and said gears for rotating the gears in reverse directions, a pair of electromagnets, an armature for each of said magnets, connections between said armatures and said clutch for moving the latter in reverse directions, a shaft, connections between said shaft and the first-mentioned shaft, means normally preventing the rotation of the last-mentioned shaft, and a projection carried by each armature and adapted to move said means after the armature has moved a predetermined distance, to allow the rotation of the last-mentioned shaft.

9. In a mechanism of the character set forth, the combination of an indicating device, a shaft, connections for driving said device from said shaft, a spring motor, means including a clutch for driving said shaft from said motor, a pair of electromagnets, an armature for each of said magnets, connections between said armatures and said clutch for moving the latter in reverse directions, a shaft, connections between said shaft and the first-mentioned shaft, means normally preventing the rotation of the last-mentioned shaft, and interengaging means carried by each armature and the former means and adapted to move the former means, after the armature has moved a predetermined distance, to allow the rotation of the last-mentioned shaft.

10. In an indicating mechanism, the combination of an indicating device, a shaft, connections for driving said device from said shaft, a spring motor, means including a clutch for rotating said shaft in reverse directions from the spring motor, a pair of electromagnets, an armature for each of said magnets, a connection between each armature and the clutch, means controlling the rotation of said motor, said means comprising a plate having a recess, a shaft operatively connected with the first-mentioned shaft, a cam on the latter shaft and projecting into the recess, means carried by said cam and arranged to engage a portion of said plate adjacent to said recess, a projection carried by each armature and adapted to engage the plate and move the same after the armature has been given a preliminary movement by its magnet, and means, operative by the rotation of the cam, for returning the plate to a position to limit the rotation of the cam.

11. In an indicating mechanism, the combination of an indicating device, a shaft, connections for driving said device from said shaft, a spring motor, means including a clutch for rotating said shaft in reverse directions from the spring motor, a pair of electromagnets, an armature for each of said magnets, a connection between each armature and the clutch, means controlling the rotation of said motor, and a projection carried by each armature and adapted to engage the controlling means after the armature has been given a preliminary movement by its magnet.

In testimony whereof, I hereunto affix my signature in the presence of two witnesses.

THOMAS W. SMALL.

Witnesses:
J. B. HULL,
BRENNAN B. WEST.